(12) United States Patent
Fisk

(10) Patent No.: US 8,698,035 B2
(45) Date of Patent: Apr. 15, 2014

(54) WELDER

(71) Applicant: C. Tyson Fisk, Coarsegold, CA (US)

(72) Inventor: C. Tyson Fisk, Coarsegold, CA (US)

( * ) Notice: Subject to any disclaimer, the term of this patent is extended or adjusted under 35 U.S.C. 154(b) by 0 days.

(21) Appl. No.: 13/665,541

(22) Filed: Oct. 31, 2012

(65) Prior Publication Data

US 2013/0056452 A1    Mar. 7, 2013

Related U.S. Application Data

(63) Continuation of application No. 12/723,536, filed on Mar. 12, 2010, now Pat. No. 8,304,682.

(60) Provisional application No. 61/160,210, filed on Mar. 13, 2009.

(51) Int. Cl.
*B23K 11/24* (2006.01)

(52) U.S. Cl.
USPC .................. 219/108; 219/130.1; 219/137 PS

(58) Field of Classification Search
USPC ......... 219/108, 76.16, 121.34, 130.1, 130.21, 219/133, 137 PS, 137.63, 696
See application file for complete search history.

(56) References Cited

U.S. PATENT DOCUMENTS

| | | | |
|---|---|---|---|
| 4,580,029 A | 4/1986 | Beaver et al. | 219/121.54 |
| 4,590,357 A | 5/1986 | Winkler | 219/130.1 |
| 4,705,934 A | 11/1987 | Winkler | 219/137 PS |
| 5,250,786 A | 10/1993 | Kikuchi et al. | 219/130.32 |
| 6,747,246 B2 | 6/2004 | Crandell, III | 219/130.1 |
| 6,818,860 B1 | 11/2004 | Stava et al. | 219/130.1 |
| 6,825,435 B1 | 11/2004 | Brown | 219/112 |
| 7,777,447 B2 | 8/2010 | Vogel | 320/107 |
| 7,858,895 B2 | 12/2010 | Moore | 219/98 |
| 8,304,682 B2 * | 11/2012 | Fisk | 219/108 |

* cited by examiner

*Primary Examiner* — Tan T. Nguyen

(57) ABSTRACT

The system provides both a portable and appliance welding system. It can be use in the shop and field. In either location it can be plugged in or battery driven. When plugged in it can weld while charging simultaneously offering 100% duty cycle for heavy shop use, and a full range of metal thicknesses can be welded with ease. The system is implemented with a solid state high energy circuit; unrestricted and unfiltered, offering a wide spectrum of pure analog power. The systems is compact for maximum portability and use in remote field operations, yet can handle deep welds in a variety of metal compositions, conditions, environments, and sizes. The system uses a proven and robust storage medium of direct electric potential energy that is supplied by industrial batteries.

1 Claim, 2 Drawing Sheets

WELDER

This patent application claims priority to U.S. Provisional Patent Application No. 61/160,210 filed on Mar. 13, 2009 which is incorporated by reference herein in its entirety.

BACKGROUND OF THE SYSTEM

There are certain circumstances where welding operations must be done in the field instead of in a workplace (at the bench). For example, when heavy machinery breaks during use, it is often infeasible or uneconomical to move the machinery to a workplace where it can be repaired. Instead, the machinery must be repaired in situ.

Prior art systems for providing field welding have a number of disadvantages in performance, economics, timeliness, reliability, noise, safety, repairability, complexity, and ease of use. One prior art attempt for field welding is the use of a generator welder or a heavy and cumbersome portable welder. A traditional portable welder may be powered in a number of ways. One method requires such a portable welder to be dependently plugged in to a utility supplied power grid via a very long drop cord. This severely limits the applicability of such a system to where utility power is available because the range of a drop cord is limited. In addition, a drop cord can short out, creating a fire hazard. In many cases, there is no power grid resource available in the location where use is required.

Prior art portable Gen-Set systems start by implementing 60 cycles alternating current (AC) electrical power, typically at 240 volts, single or three phase AC; designed on a derivation of integrated circuits (IC's) configured to regulate welder output. Heating and vibration are harmful to typical circuit elements and IC's; compounded when driven by an internal combustion engine as entropy increases rapidly inside such a system as heat exponentially increases at higher current levels. Typical portable welders deliver a narrow spectrum of low quality output power and a poor usable duty cycle at the expense of waste heat. Most Gen-Set portable welder power sources are large and heavy and will overheat while delivering, noisy noxious exhaust gases, a derated duty cycle, high consumables such as MIG/TIG components and gases. The result is a cumbersome, unpredictable, and unreliable welder output of derated performance, all at a very high cost.

BRIEF SUMMARY OF THE SYSTEM

The system provides both a portable and appliance welding system. It can be use in the shop and field. In either location it can be plugged in or battery driven. When plugged in it can weld while charging simultaneously offering 100% duty cycle for heavy shop use, and a full range of metal thicknesses can be welded with ease. The system is implemented with a solid state high energy circuit; unrestricted and unfiltered, offering a wide spectrum of pure analog power. The systems is compact for maximum portability and use in remote field operations, yet can handle deep welds in a variety of metal compositions, conditions, environments, and sizes. The system uses a proven and robust storage medium of direct electric potential energy that is supplied by industrial batteries.

Other prior art approaches to welder designs include modified transformers or even automotive alternators or generators powered by engines to motivate them. Other designs may include complex integrated circuits using mosfet, triac, thyristor and inverter current control technologies, all at increased circuit complexity and a higher initial cost. Disadvantages of such systems include a propensity to failure in harsh extremes and systems that are unrepairable remotely, and require dealer servicing for costly repairs. Existing systems designed with IC components obtusely pieced together with an alternator motivated by an internal combustion engine is an uneconomical and unnecessarily complex attempt to provide an ideal welding power source for an end user. Such designs are failure prone when impacted by harsh weather or coupled to combustion processes as typical designs overheat and output performance decays. Further, such prior art welders require special permits from the United States Forest Service (USFS) as they are notorious for catching fire or setting off forest fires. Under dynamic loads, the internal electromagnetic and thermal properties within a typical prior art welder's power source components can change undesirably out in the field. The rapid charging and discharging from shorting out a welding electrode is a very heavy electrical load requirement. Further, typical circuit designs are not ideal under such loads as they are susceptible to reactance/inductive/resistive (hysteresis) heat losses; resulting in a poor efficiency and poor power factor. For critical industrial problems this power factor must be rectified externally by large and expensive capacitor banks to achieve efficient unity. A balanced power factor is when capacitive reactance should equal inductive reactance. Otherwise, valuable energy is lost to internal hysteresis and as entropy increases, expressed as inductive heat loss.

DETAILED DESCRIPTION OF THE SYSTEM

Figure 1:
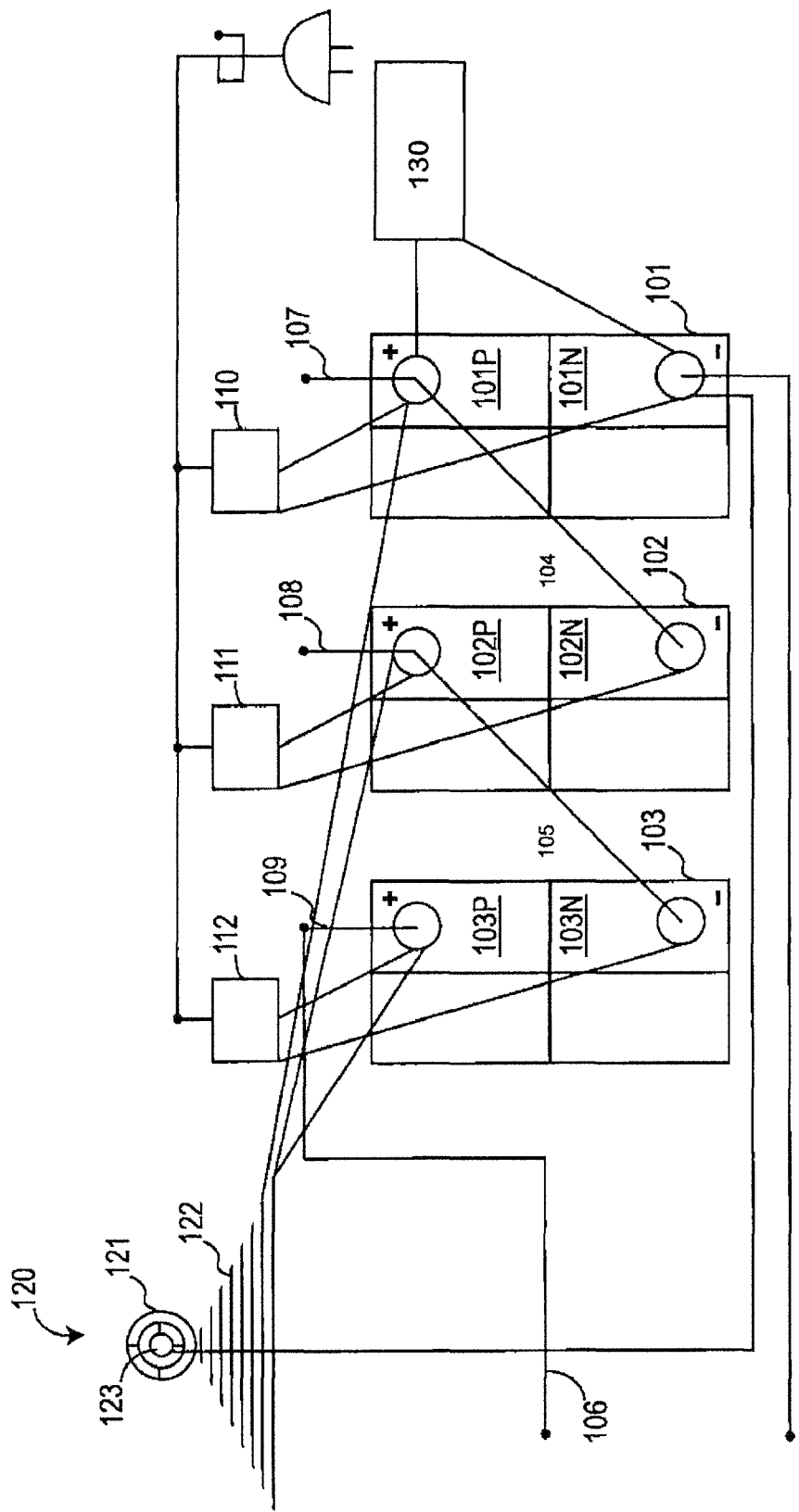
FIG. 1 is a block diagram of one embodiment of the system.

The self contained welding device serves both as a portable and shop appliance welding system plus it can operate as an auxiliary power unit (APU). In either the field or shop environment the system can be plugged in or just driven by its silent and scalable power cell battery bank until requiring recharge. An embodiment of the system uses industrial grade batteries that are upgradable as future power storage innovations are developed. The device is recharged by connection to common power outlet at only 115 volts AC/15 amps rated overnight. This improves over prior art systems that require 240 volt/50 amp outlets.

The system can also be recharged by a vehicle electrical system. This is accomplished by inserting an optional adapter to power electrode stinger, converting over to a common battery clamp. This clamp can then be coupled directly to any support vehicle +12 volt battery terminal and the remaining large clamp to frame ground The user then plugs the opposite end into device's first output stage. For heavy equipment or military vehicles/vessels with electrical systems operating at +24 volts, the same procedure is followed but connection is made into the device's second stage output. For Aircraft or any vessel at +36 volts or higher use the device's third stage.

In addition to being chargeable from a vehicle, the device may itself be used to jump start a vehicle. When fully or even partially charged the system provides the opportunity to jump start or move any dead vehicle or vessel. For simultaneous charging of the device during operation, the device is coupled to a vehicle or power supply, the charger bank plug in cord is coupled to its inboard AC power inverter, which in turn will effectively charge up all the batteries quickly within the device. Charge is pulled off a vehicle's running alternator and inboard battery combination, thereby making good use of available resources. In addition to welding, the device includes an outlet for coupling power tools via its inboard power inverter while charging simultaneously as desired.

Offering 100% effectiveness expressed as real work, a high performance duty cycle capable of extreme duty welding repairs, tool power and jump starter APU. A full range of metal thickness's can be welded with ease enabled by its proprietary power source, a safer high energy soft start low voltage output.

The device quietly conducts and generates resonant high energy hyper-phase electromagnetic waveforms within the weldments metallurgy by use of feedback through its feedback receiver. At the center of a toroidal array, easily accessible at the top of the device, there is a polymer cylindrical hollow chamber opening which may be loaded with a material sample. The chamber is then closed. The system then applies electromagnetic energy to the sample which causes field effects that represent properties of the sample. The electromagnetic permeability/reluctance and structural properties scan receives and establishes needed metallurgical information which gets combined and translated then superimposed and communicated back as a signal conducted through the electrode of the device. The integrated plasma energy is expressed into the molten weld puddle. The intelligent hyper-phase plasma energy positively influences and overcomes weldment joint disruptions. This enhances a weld's ultimate strength, flexibility, durability and overall performance. It is a function of a sample's integration scan versus the weldment's permeability/reluctance/flux density. As properties are stimulated and information is received and absorbed back into the circuit, superimposed wave reinforcement occurs. The translated intrinsic metallic energy is directly communicated back to the weldment, in a feedback loop where it is conducted and orchestrated by end user by the proprietary devive electrodes which become one with the newly welded joint. The device's own stored energy is conducted back to the system, a feedback scan in the system receives and generates information, an energetic expression of hyper-phase waveforms are established by overall feedback reactions. Simply translated, information is transmitted out, received, translated by superposition, then communicated back to the weldment as conducted through the electrode as plasma expressed has a uniform magnetic flux action. The information rides upon the energetic plasma's carrier waves as conducted by electrode as it fuses together with the weldment's molten puddle and joint.

This circuit design, methodology and process; allows one to conduct most efficiently intense high energy welds remotely out in the field. The plasma impulses react and radiate Excimer like radiation blasting away impurities while reconstructing metal at intrinsic scanned feedback frequencies to subatomic wavelengths.

The device orchestrates a wide spectrum of intrinsic to metallic electrodynamic pulsating power, its energy transformation conducts a powerful deep cleaning action to the weldment. Further, the output enables the welding of irregular or contaminated or irregular joints and compensates for any magnetic field disruptions, as a scanned samples properties command, offering a tight molten puddle and a high cling force. This is ideal for extreme out of position welding or in harsh weather.

The device's output offers a gentle but pulsating soft start or impulse, so that the electrode doesn't vaporize material away or get frozen to the weldment. Later, higher energy impulses enables the electrode to operate while being plunged deeply to the core of the joint and weld it from the inside out. Stably and deeply under pressure the hyper-phase plasma arc thrusts and works under the molten puddle. The operation powers through tough compositions and conditions in sensitive or severe environments, only emitting the same electrode by-products. When finished the flux usually just lifts up and is most easily removed by a simple flick, tie in welds are easily stackable. This scalable device starts and works off of stored potential electrical energy. It utilizes a proven and robust storage medium able to withstand extremes, starting off stored scalable amounts of electric potential energy. All that is required are industrial batteries or any charge storage device can be utilized, even a fuel cell or hybrid capacitors. Innovative industrial power cells or batteries are used in one embodiment, which may have Military spec ratings, depending on build requirements.

The system provides a way of harnessing, conducting, and orchestrating very high potential electric energy into intrinsic kinetic standing energy waves; generating an intense welding plasma, quietly, emissions free, and safely. Unimpeded analog energy of wide spectrum resonance occurs within, generating an intrinsic metal welding plasma.

The system's output power is not derived from any power regulated, digitally tuned, or filtered integrated circuits. Instead, the devices output power is derived by a unique robust combination of a tuned resonant conductive power harness; tuned cables and electrode to metal interface, directly connected to a power supply conducting unrestrained power, at the nearest unity power factor possible. Unique power pulsations are conducted directly to the metal by proven: cable connectors, harness, cables and electrode.

A self powered appliance; Consists of innovative industrial batteries, chargers, a tuned heavy gauge wired power harness containing a specialized feedback device, an feedback receiver housed within a recyclable shock absorbing, non conductive, non corrosive advanced polymer enclosure. Potential energy is stored within batteries then translated and transformed via high energy circuits design. The electrode at joint spark gap conducts and orchestrates enhancing energy. The plasma consists of a wide spectrum of high frequency electromagnetic pulsed energy, hyper-phased, excited by design for reception of resonance phenomenon. Electron charges are driven by the device then the weldment's metallurgy, self perpetuating, biasing and translating metallic intrinsic electromagnetic hyper-phase standing waves as intelligent energy. The device senses and receives then stores the metallic crystalline structures signatures.

The device initially charges up and drives its high energy circuit harness containing the proprietary feedback receiver which can be loaded with a desired sample to react and bias the circuit into more desired coded information, expressed as an effective energetic response.

The energy is best conducted in one embodiment by the proprietary compounds found in Thunder-Bolt-Rods having extremely low hydrogen and impurities content. As the weldment circuit becomes biased it in turn begins to resonate deeply and intrinsically in response to the weldment's metallurgies transforming energy into ideal energetic welding requirements. Corresponding to total systems and samples permeability/reluctance and properties stimulated; in order to determine and establish natural frequencies and amplify a unison from within, all according to superposition phenomenon. Energizing and reacting via feedback the reception converts stored electrical energy into an intelligent welding plasma energy. Completing the circuit generates an intensely effective welding plasma, simply, quietly, emissions free and safely.

Generated in a tight zone is an intense arc of hyper-phase plasma energy fully tuned into the weldment. This tuned plasma drives intrinsic homogeneous inductive mixing of metals as eddy currents form deep within the weld puddle within joint of weldment, compressing out and incinerating impurities, as augmented by device expressed as welding plasma. The plasma impulses react and radiate Excimer like radiation blasting away impurities while reconstructing metal at intrinsic scanned feedback frequencies to subatomic wavelengths.

The welder system's output power is not subject to any power grid ac alternated or generated power. It is not regulated or filtered power or power from integrated control circuits. Instead, the device's output power starts off a robust combination of charged up electrical potential energy storage devices, IE: power cells, fuel cells, batteries or the like. Further its feedback loop will condition the power cell within batteries and effectively remove any sulphide crystal formations or bridge shorts, boosting longevity from its regenerative charging action. Potential energy gets transformed by a tuned resonant conductive power harness reacting with the feedback receiver as loaded with a desirable sample, tuned cables, Thunder-Bolt electrodes and the joint spark gap interacts with the weldment itself. Conducting and orchestrating unrestrained smart power, at the nearest unity power factor possible; unique and intrinsically tuned impulse power pulsations are generated, smart information gathers and gets communicated then conducted back through the electrode to the weldments affected areas: disrupted joint, metallic structures, air/spark gap. The devices output overcomes these disruptions as biased by metallurgies, device performance is enhanced by feedback of samples scan.

An embodiment of the system; Is illustrated in FIG. 1. The device's power cells or batteries are hooked up in series and have an output tap or stage emanating from each positive terminal. In the embodiment all that is needed is one negative ground terminal to ground the weldment safely. In the example of FIG. 1 (while being scalable) the example system uses a three stage power source, comprising power cells 101, 102, and 103. Although the example is shown with three power cells, the system is easily scalable increased or decreased, so that amplification of different potential power development can be implemented. Depending on the desired use, the number of power cells or batteries can affect the capacity, weight and size of the system. A three or four power cell system has been found to be substantially smaller, lighter and more cost effective than previous generator or other powered systems.

The batteries or power cells are coupled to each other in the following manner in one embodiment. The positive post 101P of power cell 101 is coupled to the negative post 102N of power cell 102 via connector 104. The positive post 102P of power cell 102 is coupled to the negative post 103N of power cell 103 via connector 105. The positive post 103P of power cell 103 is coupled to the gap 106 along with the negative post 101N of power cell 101. The system is scalable as more batteries could be added in parallel to add potential energy capacity.

In one embodiment; Connectors 104 and 105 are 3/0 AWG or thicker interconnects. These interconnects are tuned into the system to provide maximum performance. Each positive post; 101P, 102P, and 103P is tapped via tuned length weld terminals 107, 108, and 109 so that different power levels can be selected and used. The tap 107 is the low power tap, tap 108 is medium power, and tap 109 is high power, scalable ramped design. Each respective tap can also be used for remote charging or jump starting heavy equipment or vessels at its respective voltage. Internally over sized components and tuned lengths of heavy cables enhance performance.

The system employs separate high efficiency/frequency chargers 110, 111, and 112 for power cells 101, 102, and 103, respectively. The chargers should be hooked up in one embodiment via a surge protector to a standard 115 v, 60 Hz, 15 amp plug, allowing for reliable continuous charging during operation where power is available.

The embodiment of FIG. 1 can induce a tuned pulsed plasma of very high intensity into a very tight zone; hyperphase energy as informed waveforms are able to sustain an arc jet under subsurface electrode plunging. The intense subsurface energetic hyper-phased plasma continues to weld under a molten compressed atmosphere. The system enables welding deeply through base metals to more completely weld a joint inside out penetrating most completely. Intense plasma heating under magnetic forces of EMP/EMF augments impulse a higher energy release for homogeneous rapid inductive mixing and cleaning action to condition the weldments metal/electrode as well as the weld joint at puddle, while compressing out impurities. This welding process is least affected by gravity or wind in any position.

The system also includes a feedback receiver 120 comprising a strand of parallel toroids 121 and conductive elements which react as channeled string antennas 122. The feedback receiver is scalable, with at least one separate end directly connected in parallel at each separate positive terminal power stage tap acting as an anode element in one embodiment. The channeled string are free to pulsate, receive and build up preponderant electrodynamic energy. Receiving, storing, and transmitting energy, each strand terminates into an additional torus or antenna element. In the centers 123 of the toroids 121 resides a chamber or cell to contain a desired weldment sample for property scanning. There is also at least one negatively charged energy element directly connected in parallel to the last battery's negative terminal, where the battery is directly connected to the weldments clamp. These positive and negative elements are free to swing in relation to the field on the sample, creating a feedback environment that is unique for each sample. This drives and safely grounds the weldment as a clean running cathode. Its electrodynamic properties react and vibrate to electromagnetic power pulsations (EMP/EMF collapses). Preponderant rogue energy is translated by superposition transformation. Informed energy amplification begins to build up and is released as output. The feedback loop stimulates harmonic resonance and radiation occurs as standing waves build within the weldment as biased off the sample by total system influences. The feedback receiver 120 interacts and scans the sample which forms a functional expression of analog properties such as permeability, reluctance and flux density all reacting at will. In this way the device translates and transforms energy into valuable information to be embedded or injected back onto the carrier wave as enriched output. (In an alternate embodiment imaging technology receiving feedback from the feedback system at extremely low impedance is applied allowing technical imaging of the welder performance and structure at will during operation without negatively affecting results). The feedback receiver 120 enhances welding by injecting intelligent energy back into the respective devices output terminals at stages being used, an established receptive intelligent feedback loop.

Tuning and attenuating the device is automatic as impulses increase over time as energy and heat builds up. A functional work expression of: base and sample metallurgies, metallic properties, electrode composition, surface area, mass*natural frequencies of conductivity/device bandwidth=kinetic energy output at unity. This circuit design methodology and communications process harnesses and allows one to conduct most efficiently, intelligent high energy welds remotely out in the field, simply and with ease. The system impulses with highly focused intense resonant plasma radiation. This blasts away tough impurities while reconstructing metal at its intrinsic metallic structures; according to feedback information from the subatomic quantum string reactions of the scan by the feedback receiver 120. The device easily overcomes the magnetic disruptions of weldment joint metal and its air gaps. The plasma reacts favorably at will as it thrusts an audible arc either above or subsurface into the base metal as conducted by the end user using a selected electrode. In one embodiment the electrode is a low hydrogen content electrode that is usable with DC current. Ideal homogeneous mixing and reconstruction of metal occurs, creating ultra rapid crystalline structures to form, as ultra clean X-Ray quality welds freeze up, in any position.

Figure 2:
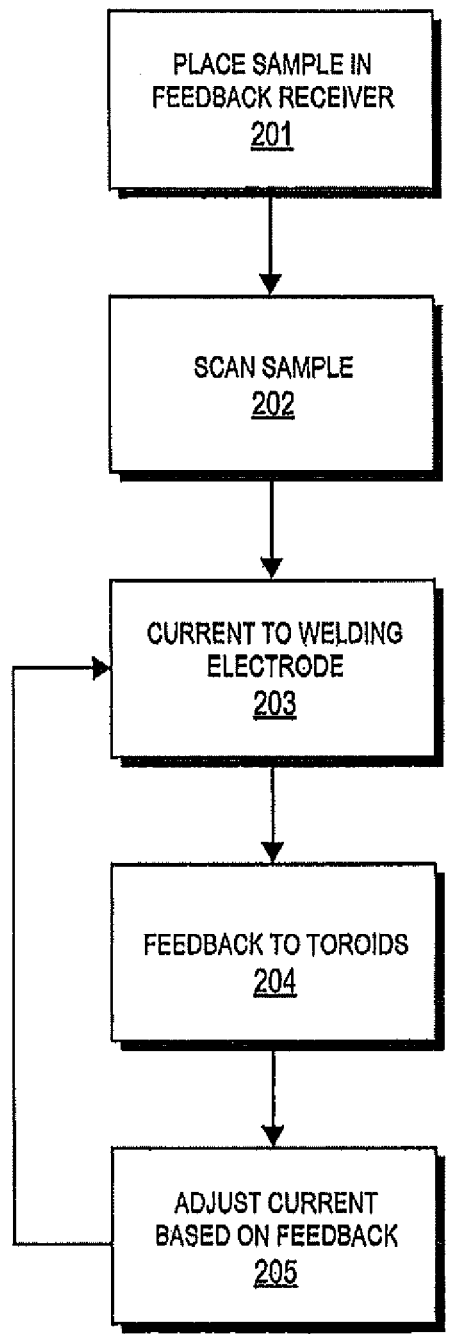
FIG. 2 is a flow diagram illustrating the operation of the system.

The operation of an embodiment of the system is illustrated in the flow diagram of FIG. 2. At step 201 a sample of the target metal is placed in the feedback receiver. At step 202 the sample is scanned so that the properties of the sample, including metallurgies, metallic properties, electrode composition, surface area, mass*and natural frequencies of conductivity/device bandwidth=kinetic energy output at unity can be determined. At step 203 current is supplied to the welding electrode based on the results of the scan. At step 204, during welding, there is feedback to the feedback receiver. At step 205 the feedback receiver automatically adjusts the welding current based on the feedback and then returns the new current to the welding electrode in the feedback loop at step 203.

The system induces into the weld puddle an energy field stimulating metal to behave with high molten cling, freezing rapidly forming tight crystalline structures. The result is ideal for welding, out of position, out in harsh weather.

The ramped three stage power circuit offers soft start properties, reducing burning and spraying of molten metal. It is compact and portable. Power loss is non existent due to its highly conductive oversized components, conductors, connectors and use of a capacitive electrode cable. The system welds with ease the thinnest to thickest of metals, sheet metal to one inch plus. The system has high reliability; a solid state design, no moving parts or switches, resulting in near zero failure rating. Welds are highly repeatable, clean and stackable. The system welds through impurities with minimal surface prep. The device can be used anywhere, any time as well as provide auxiliary power for tools, with minimal disturbance inside sensitive areas.

The system runs at a low energy voltage for the first few moments and impulses so the electrode that can reach deep into the tightest of spaces without shorting out or blasting through the side coatings. The electrode can plunge deeply performing subsurface welds. As compared to MIG welding; there is no cumbersome spool wire feeder or gun components to burn up, break down or get in the user's way. The operator can plunge the electrode deep below metal surfaces to weld front the inside out. The results are excellent bead appearance, the slag is easily removed, frequently self lifting.

All ferrous and non-ferrous conductive metals can be welded including hard metals requiring manganese content and cast Iron welds.

In one embodiment, the system of FIG. 1 can be implemented in a watertight container completely epoxy filled and sealed for underwater or severe environmental applications.

It is initially tuned and started up by selecting the appropriate staged output power tap, selected in unison to a properly sized electrode to answer the magnitude of welding task required. A smaller diameter electrode (e.g. 3/32") restricts higher current and a thicker electrode (e.g. 1/8") allows more current energy to propagate; while increasing to 5/32" An electrode of the system up to 1/4" conducts even higher current. This along with staging one of the output power taps commands both start up current to overall current or overall energy conducted. Colder or heavier metal will conduct higher current energy initially.

As external to internal metallic heating builds up and begins to conduct through the base metal, the wide spectrum energy output released by the device begins to transform dynamically and harmonically to it, as the electrodynamic conductivities of the metals change impulses build accordingly. The plasma at the spark gap weld joint controls and orchestrates high frequency standing waves as rapid EMP fields collapse building up and releasing plasma energy. Harmonic resonance drives the ideal energy needed by the feedback loop as is conducted and delivered by the system. The circuit's conductive nature and output energy is dynamically orchestrated according to weldments, samples, the spark gap at the joint and the systemic intrinsic properties stimulated. The welding plasma contains a full spectrum of structural characteristic information expressed as work performed superimposed within energetic frequencies reactions. Focused energy is unfettered by digital influence, the analog information is injected directly on energetic carrier waves. The plasma temperature build up equates to increasing electrodynamics intrinsically to the feedback scan of total metallurgies of system expressed at electrode interface. The overall dynamics and electrode size selection automatically tune in the amount of actual current energy being conducted, amplified or actually used through the weldments shorted arc circuit . . . . Another benefit is the conditioning and cleaning of the capacitive plates within the batteries power cells internally, this equates to a prolonging benefit from the removal of sulphides off the internal power cell plates under the influence of the high frequency regenerative energy pulsations.

What is claimed is:

1. An apparatus comprising:
   a power source for a welder comprising a plurality of tuned fuel cells wherein each fuel cell has a tuned connection from its terminal to a terminal of another fuel cell,
   a plurality of tuned length weld terminals coupled to the fuel cells providing energy amplification and superimposed wave reinforcement, and conductive elements which react as channeled string antennas.

* * * * *